UNITED STATES PATENT OFFICE.

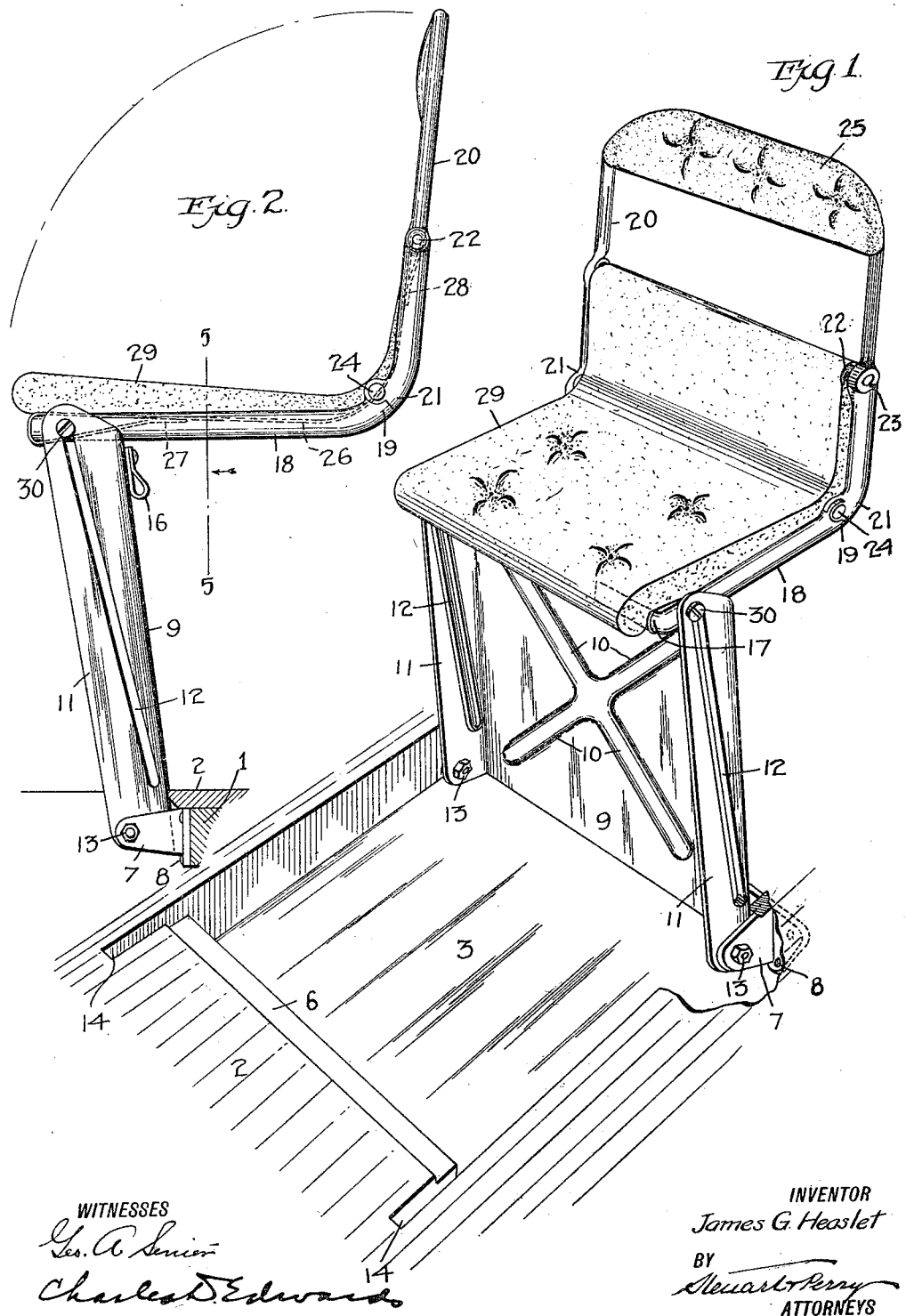

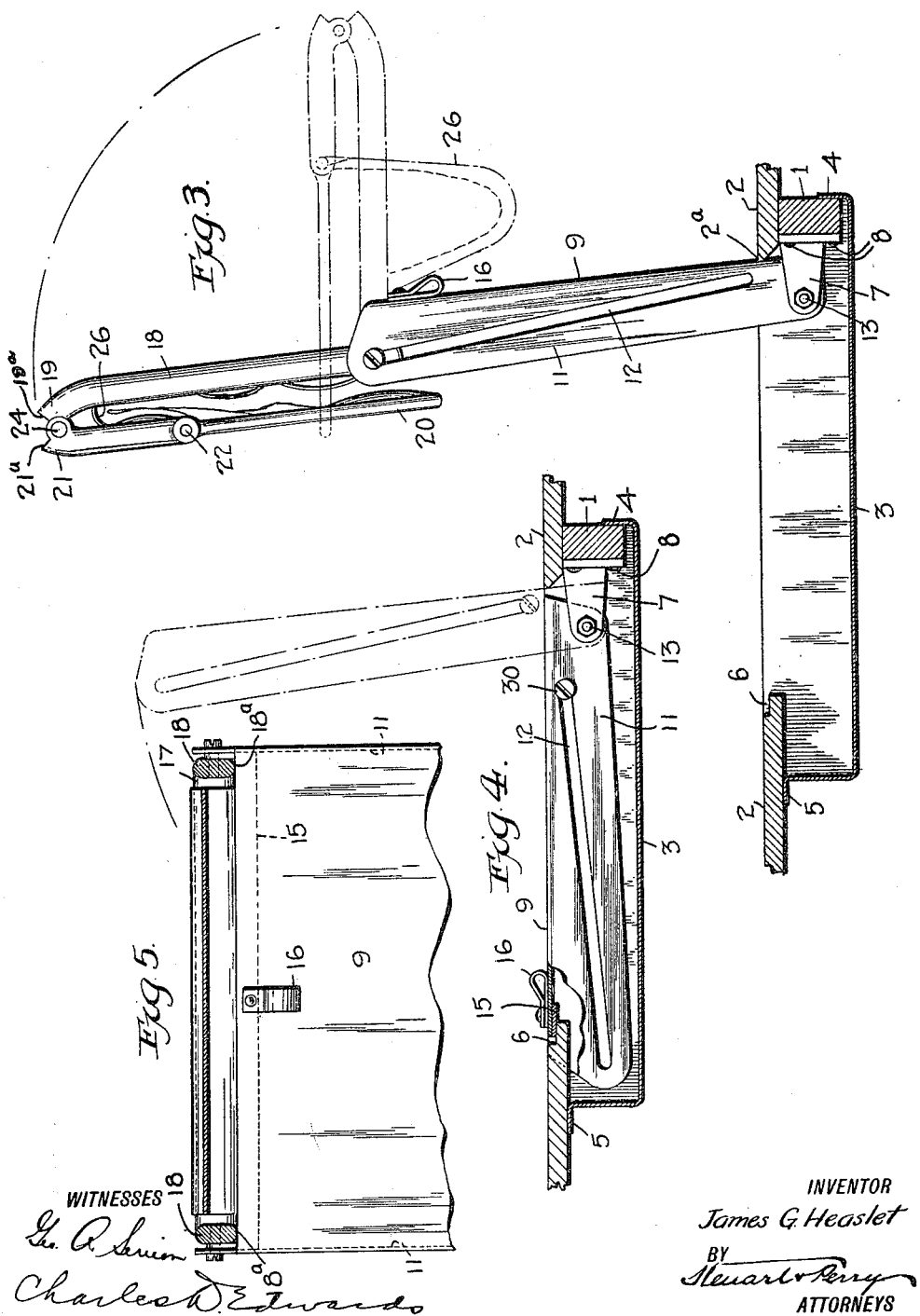

JAMES G. HEASLET, OF DETROIT, MICHIGAN, ASSIGNOR TO THE STUDEBAKER CORPORATION, A CORPORATION OF NEW JERSEY.

COLLAPSIBLE SEAT.

1,231,156.  Specification of Letters Patent.  Patented June 26, 1917.

Application filed March 25, 1915. Serial No. 16,844.

*To all whom it may concern:*

Be it known that I, JAMES G. HEASLET, a citizen of the United States of America, and resident of the city of Detroit, county of Wayne, State of Michigan, have invented certain new and useful Improvements in Collapsible Seats, of which the following is a specification.

My invention relates to an improvement in collapsible seats adapted more particularly for use in the tonneau of an automobile and so mounted with reference to an aperture in the floor of the automobile as when folded to be normally stored beneath the floor.

I have illustrated my invention in the accompanying drawings wherein Figure 1 is a perspective view; Fig. 2 is a side elevation; Fig. 3 is a side elevation showing the floor in section and the seat partly folded and ready to be run into its sheath. Fig. 4 is a vertical section of the floor and the container showing the seat folded therein, while Fig. 5 is a vertical section taken on the lines 5—5 of Fig. 2.

1 is a cross beam forming part of the frame of the automobile, while 2 is the floor having a rectangular aperture cut out of the same to receive the chair when folded. 3 is a rectangular container secured to the beam 1 at 4 and to the underside of the floor at 5, thus forming a container for the seat when folded. 6 is a beveled shelf at one edge of the floor 2. 7—7 are brackets secured to the beam 1 by the bolts 8. 9 is a channel member preferably corrugated as at 10 to give strength to the sheet metal. 11—11 are the right angular channel flanges, each of which is provided with a longitudinal slot 12. The channel member 9 is pivotally secured at one end thereof to the brackets 7 by the bolts 13. 14—14 are slots in the floor adapted to receive the ends of the flanges 11 when the seat is folded. 15 shown in section in Fig. 4 and in dotted lines in Fig. 5 is a reinforcing bar secured to the interior of the plate 9 of the channel iron. 16 is a finger loop secured to the plate 9 of the channel iron as a convenient means for lifting the folded chair out of its storage place in the floor. It will be noted that the channel member 9 thus has a pivotal movement on the bolt 13 so that it may be folded down into the aperture in the floor, but its pivotal movement is limited in one direction by contact with the floor at 2ª. I characterize the flanges 11 of the channel member 9 as seat supporting members. The seat and back members comprise the following elements, the seat member consisting of a U shaped piece preferably of tubular construction having a front bar 17 and side bars 18—18, the ends of the bars 18—18 being constructed to form half of a hinge. The section 20 forming the back of the seat is also of U shape and preferably of tubular construction, the arms of the U being constructed to form a half of a hinge as at 21—21, the same coöperating with the half of a hinge 19 to form a pivotal joint, the same being secured together by the bolt 24 and the pivotal movement of said hinge being limited by the abutting faces 19ª and 21ª. The U-shaped member is provided with holes 23 in which is mounted the bar 22. The upper end of the back section is preferably padded as 25. Secured between the bar 22 and the bar 17 is a sheet of leather or other suitable material as 26, the same being looped around said bars and secured as at 27 and at 28. I prefer also to overlay the sheet 26 with a padded cushion as 29 which is secured either at the ends thereof or at any other convenient points to the leather strip 26. The seat member is mounted between the supports 11—11 by bolts as 30 passing through the slot 12 and into the bars 18, the head of the bolt being larger than the width of the slot. The seat member is fulcrumed by contact between the bar 18 and the edge of the sheet 9 and reinforcing strip 15 as at 18ª, when the bolt 30 is at the upper end of the slot 12.

The operation of the device is as follows: Assuming that the seat is in the position shown in Fig. 1 and it is desired to fold the same, the back section 20 is moved on its pivot 24 and folded down on to the seat member as shown in dotted lines in Fig. 3. Under these conditions, the leather strip 26 takes the form shown in that figure. The back and seat members are then moved to a substantially vertical position as is shown in Fig. 3. They are then forced downward, the bolts 30 moving in the slot 12 until they are seated at the end of said slot. Thus the back and seat members are received between the supporting members 11 as within a sheath. The channel member now is folded into the aperture in the floor 2, thus being included within the rectangular casing 3.

The supporting members 11 enter the slots 14 and the sheet 9, forming the web of the channel member, closes the aperture in the floor and is flush therewith. The brace 15 rests on the beveled section of the floor. To open the seat for use the loop 16 is employed to lift the supporting members into a substantially vertical position. The seat member is drawn out as in Fig. 3 and the seat and back members are unfolded as previously described. It will be noted that the supporting members 11 are limited in their pivotal movement by contact with the floor at $2^a$, and that the pivotal movement of the seat is limited by contact between the bolts 30, and the end of the slot 12, and its fulcrum point $18^a$, while the pivotal movement of the back is limited by the abutting faces of the hinge $19^a$ and $21^a$. The center of gravity of the seat when in use is well to one side of a vertical plane passing through the pivotal points 13 of the supports 11; hence the weight carried by the seat operates to maintain the same in appropriate position for use. The feet of the occupant of the chair may rest within the casing 3 or obvious means not disclosed may be used to close the aperture in the floor.

What I claim is:

1. A collapsible seat embodying two supporting members, each pivotally mounted at one end to a fixed support, and each of which members is provided with a longitudinal slot, means for limiting the pivotal movement of said members, in one direction, to a position in which both members are substantially vertical, a seat provided with trunnions positioned in the slots of the supporting members to adapt the seat for bodily movement longitudinally of the slots and pivotal movement when the trunnions are at the ends of the slots adjacent the free ends of said members, and means for limiting the pivotal movement of the seat in one direction to a position at substantially right angles to the supporting members.

2. A collapsible seat embodying two supporting members, each pivotally mounted at one end to a fixed support, and each of which members is provided with a longitudinal slot, means for limiting the pivotal movement of said members, in one direction, to a position in which both members are substantially vertical, a seat provided with trunnions positioned in the slots of the supporting members to adapt the seat for bodily movement longitudinally of the slots and pivotal movement when the trunnions are at the ends of the slots adjacent the free ends of said members, means for limiting the pivotal movement of the seat in one direction to a position at substantially right angles to the supporting members, a back pivoted to said seat, and means for limiting the pivotal movement of the back to a position substantially at right angles to the seat.

3. A collapsible seat adapted to be folded and stored in a floor comprising a floor with a suitable aperture therein, two supporting members each having a longitudinal slot, means to pivotally mount each of said members within said floor aperture and means to limit their pivotal movement in one direction to a position substantially perpendicular to said floor, a floor section mounted between said supporting members and adapted to close said aperture in the floor when the seat is folded into said aperture, a seat member, means to mount said seat member between said supporting members by means operating within said slot to permit the seat to slide in the slot and rotate, means to limit the rotary movement of the seat in the same direction as the limitation of the movement of the supporting members, such limiting means operating in conjunction with the means to secure the seat to the supports to sustain the seat in a position substantially at right angles to the support, a back member and means to pivotally connect said back member to the seat member at the side thereof opposite its connection with the supporting members and means to limit said pivotal movement in the same direction as the limitation of such movement of the supporting and seat members, such limitation operating to support the back member substantially at right angles to the seat.

4. A collapsible seat embodying a trap door mounted for pivotal movement at one edge of a recess in a floor, a seat section pivotally and slidably mounted on the trap door, and a back section pivotally secured to the seat section, such pivotal connections being adapted to limit the pivotal movement of the respective sections and the door in one direction so that the seat will be in a substantially horizontal plane and the back and seat at substantially right angles to each other, said back and seat sections being foldable and slidable into juxtaposition to the trap door whereupon the whole may be folded into the recess in the floor.

5. A collapsible seat embodying a suitable floor base provided with an aperture, a supporting section pivotally secured thereto, a seat section directly pivoted to the supporting section, means for limiting the pivotal movement of the seat section, relative to the supporting section, in one direction, means for limiting the pivotal movement of the supporting section in the same direction and to such position that the seat section will be substantially horizontal, a back section directly pivoted to the seat section, and means for limiting the pivotal movement of the back section in one direction to a position wherein the back section will be at substantially right angles to the seat section, the supporting section and the seat section being also slidably connected whereby, when the latter is slid into juxtaposition with the former, the supporting section is adapted to be pivotally moved to bring the floor section carried thereby into coöperative relation with, and to close, the aperture in the floor base when the seat is collapsed.

6. A collapsible seat formed of three sections, a supporting section comprising a channel iron having a web and two flanges at right angles thereto provided with longitudinal slots and pivotally connected at one end to a floor beam, a seat frame of U shaped form mounted at one end thereof between said flanges and within said slot to have a slidable and rotary movement, and at the ends of the U arms provided with halves of a hinge, a back section consisting of a U shaped frame, the ends of the arms provided with halves of hinges adapted to coöperate with those last mentioned, a bar intermediate the U shaped back, a belt secured between said bar of the back and cross bar of the seat, the pivotal movement of the channel iron being limited in one direction to a position substantially vertical with the base, the pivotal movement of the seat being limited to a position substantially at right angles to the support, the same being fulcrumed adjacent its connection with the support at the upper end of the slot, the back member being limited in its pivotal movement to a position in the same direction at substantially right angles to the seat, a floor aperture and a casing therein adapted to receive the seat when collapsed, the parts being so arranged that the web of the channel when the seat is folded is flush with the floor.

7. A collapsible seat embodying a supporting device pivotally secured at one end to a recessed floor and adapted, when folded into horizontal position, to be substantially flush with the floor and close the recess therein, means for limiting the pivotal movement of said device, in one direction, to a position wherein it is substantially at right angles to the floor, a seat provided with trunnions coöperating with guidways on the supporting device to adapt the seat for sliding movement longitudinally of said device and pivotal movement when at one extremity of its sliding travel, said seat being adapted to engage, when thus pivotally moved to a substantially horizontal position, with the supporting device to preclude further pivotal movement in such direction, said seat being slidable into juxtaposition with the supporting device whereby, when the latter is folded into its horizontal position, the seat is concealed within the recess of the floor and the exposed face of the supporting device serves as a continuance of the floor over said recess.

8. A collapsible seat embodying a trap door pivoted at the edge of a recess in a floor and adapted to be opened into an upstanding position relative to the floor, a seat having pivotal and slidable connection, near its front edge, with the under side of the trap door, whereby the seat may be slid to the free end of the trap door and pivotally moved to a substantially horizontal position wherein the major portion of the seat will overhang the free edge of the door and extend rearwardly thereof, said seat being pivotally and slidably movable into juxtaposition with the inside of the trap door whereupon the closing of said door conceals the seat within the recess of the floor.

Signed at the city of Detroit, Michigan, this 22nd day of March 1915.

JAMES G. HEASLET.

Witnesses:
R. E. SCRATCH,
G. M. EGGLESTON.

Copies of this patent may be obtained for five cents each, by addressing the "Commissioner of Patents, Washington, D. C."